United States Patent [19]

Parton et al.

[11] Patent Number: 5,102,448
[45] Date of Patent: Apr. 7, 1992

[54] INK-JET PRINTING

[75] Inventors: Brian Parton, Bury; Donald M. Gunn, Stockport, both of England

[73] Assignee: Imperial Chemical Industries PLC, London, England

[21] Appl. No.: 439,622

[22] Filed: Nov. 21, 1989

[30] Foreign Application Priority Data

Nov. 28, 1988 [GB] United Kingdom ............... 8827781

[51] Int. Cl.$^5$ .................. C09D 11/02; C09D 11/00
[52] U.S. Cl. ........................... 106/22; 106/23; 106/20; 106/32; 8/647; 524/539
[58] Field of Search .............. 106/20, 22, 23, 25, 106/27, 32; 528/354; 524/539; 346/75; 8/647

[56] References Cited

U.S. PATENT DOCUMENTS 4,614,682 9/1986 Suzuki et al. .................. 106/31
4,933,426 6/1990 McClelland et al. .................. 8/647

FOREIGN PATENT DOCUMENTS 0036787 9/1981 European Pat. Off. .............. 346/75
0178888 4/1986 European Pat. Off. .............. 346/75

Primary Examiner—William R. Dixon, Jr.
Assistant Examiner—Timothy Saunders
Attorney, Agent, or Firm—Cushman, Darby & Cushman

[57] ABSTRACT

A method of printing in which a solid ink composition is melted and ejected from a small orifice in the form of small drops directed towards a substrate on which an image is to be formed, characterized in that the solid ink composition comprises either a solution or a dispersion of a dye or a finely divided pigment in a halogenated hydrocarbon having a melting point of at least 50° C. ("Ink A"), or a colored condensation polymer obtained by reacting a polymerizable lactone or a hydroxyalkanoic acid with a dye containing at least one active hydrogen atom ("Ink B").

8 Claims, No Drawings

INK-JET PRINTING

This invention relates to ink-jet printing and more particularly to the hot melt ink-jet printing process.

Ink-jet printing systems have been fully described in the prior art, for example in European Patent Publication No.0187352. Briefly, in the ink-jet printing process, droplets of ink are generated in various ways and deposited on a substrate to effect a record. In general, the droplets are deposited on the substrate following ejection from a small orifice.

One type of ink used in ink-jet printing comprises as essential components, a recording agent (usually a dye or a pigment) and a liquid vehicle (usually water, an organic solvent or mixtures thereof) and, as optional components, various other additives.

Another type of ink useful in ink-jet printing comprises a so-called hot melt or thermoplastic ink having a wax base. These inks, being solids, must be melted before being ejected from the printer as a liquid which solidifies on the relatively cool surface of the substrate. The hot melt ink-jet printing process is described in some detail in the aforementioned EP-A-0187352 where it is stated that the wax base may be replaced by materials such as oleic acid, polyethylene and blends or mixtures of such materials.

It has now been found that other solid ink compositions as hereinafter defined may advantageously be used in the hot melt ink-jet printing process.

Accordingly, the invention provides a method of printing in which a solid ink composition is melted and ejected from a small orifice in the form of small drops directed towards a substrate on which an image is to be formed, characterised in that the solid ink composition comprises either a solution or a dispersion of a dye or a finely divided pigment in a halogenated hydrocarbon having a melting point of at least 50° C. ("Ink A"), or a coloured condensation polymer obtained by reacting a polymerisable lactone or a hydroxyalkanoic acid with a dye containing at least one active hydrogen atom ("Ink B").

Ink A

When Ink A is used in the method of the invention, the halogenated hydrocarbon may be present as the sole transferable medium or it may be used in conjunction with other suitable solid materials which can be melted prior to ejection from the orifice.

The transferable medium preferably contains at least 80%, more preferably at least 90% and especially from 95% to 100%, of the halogenated hydrocarbon. The remaining portion of the transfer medium may consist of waxes such as carnauba wax, paraffin wax and softening agents such as stearic acid, chlorostearic acid and oleic acid and crystallisation inhibitors such as oligomeric and polymeric acrylates.

The halogenated hydrocarbon preferably has a softening point of from 50° C. to 100° C. It is preferably a chlorinated paraffin having a chlorine content of from 65% to 72% by weight obtained by chlorinating a paraffin or mixture of $C_{18-35}$-paraffins.

As indicated above, the chlorinated paraffin may be based on a single paraffin or on a mixture of paraffins. However, although chlorinated single paraffins can be made and are known, the common commercially available products comprise mixtures obtained by chlorinating mixed paraffins having a range of carbon chain lengths. It will be appreciated that, for example, a nominal $C_{18-26}$-paraffin fraction, such as might be used to prepare a chlorinated paraffin for use according to the invention, may contain small amounts of paraffins of chain length outside the specified range.

The chlorinated paraffins may be produced by chlorination of a suitable paraffin feedstock to the desired chlorine content in known manner. Any of the known methods for the production of chlorinated paraffins may be employed, these methods generally comprising passing chlorine gas into the liquid paraffins at a temperature above about 80° C.

The chlorinated paraffins may contain any of the additives such as stabilisers and modifying agents normally incorporated in chlorinated paraffin compositions. Commercially available chlorinated paraffins usually contain a stabiliser or mixture of stabilisers to impart light-stability, high-temperature stability and storage stability to the compositions. A common stabiliser is an epoxide such as epoxidised soya bean oil.

Dyes which may be present in Ink A are preferably soluble in the halogenated hydrocarbon. This solubility characteristic distinguishes dyes from pigments which, in general, are substantially insoluble in the medium in which they are used.

Suitable dyes will generally contain no water-solubilising groups, that is to say no ionic groups such as sulphonate groups. As examples of suitable classes of dyes, there may be mentioned dyes classified in the Colour Index as Disperse dyes or Solvent dyes. Provided the preferred dyes have suitable solubility characteristics, the chemical class is not important except for the consideration that certain colours may be associated with particular chromophores. Preferred dyes are members of the azo, anthraquinone or benzodifuranone series but may also belong to any of the other known classes of dyes such as those mentioned hereinafter.

Pigments which may be present in Ink A are preferably organic pigments.

Examples of suitable organic pigments are those in the azo, disazo, thioindigo, anthraquinone, anthanthrone, isobenzanthrone or triphendioxazine series, vat dye pigments, phthalocyanine pigments, such as copper phthalocyanine, its nuclear halogenated derivatives and copper tetraphenyl and octaphenyl phthalocyanines, quinacridone pigments, lakes of acid, basic and mordant dyestuffs and especially pigments of the three primary shades of yellow (e.g. C.I. Pigment Yellow 12), red (e.g. C.I. Pigment Red 57) and cyan (e.g. C.I. Pigment Blue 15).

Such pigments are described in, for example, Volume 2 of the 2nd Edition of the Colour Index which was published in 1956 under the heading "Pigments" and in subsequent authorised amendments thereto.

As examples of suitable inorganic pigments, there may be mentioned the transparent iron oxides.

The pigments are preferably formulated as a dispersion by milling in a suitable organic solvent such as tetrahydrofuran, in conjunction with dispersants and/or fluidising agents.

Any suitable dispersant known in pigment technology may be employed but preferred dispersants are polymeric dispersants in which the solvatable chain is derived from a hydroxyaliphatic acid, such as hydroxystearic acid, ricinoleic acid and caprolactone, or a mixture thereof. Especially preferred dispersants are those which also incorporate an alkylamine, especially a polyalkyleneimine, such as are described in GB 1,373,660, EP 158,406A and EP 208,041A.

Suitable fluidising agents are disclosed in GB 1,508,576 and GB 2,108,143. The fluidising agent of GB 1,508,576 is a substituted ammonium salt of a coloured acid wherein there are from 19 to 60 carbon atoms in at least 3 chains attached to the N atom of the substituted ammonium ion. In a preferred fluidising agent of this type for use with a phthalocyanine pigment, the coloured acid is a copper phthalocyanine sulphonic acid containing, on an average, from 1 to 2 sulphonic acid groups. The coloured acid, as opposed to the ammonium salt, may itself be used as a fluidising agent. The fluidising agent of GB 2,108,143 is a water-insoluble disazo compound comprising a central divalent group free from acidic and other ionic substituents linked, through azo groups, to two monovalent end groups, one end group being free from acidic and other ionic substituents and the other carrying a single substituted ammonium salt group. Such fluidising agents are useful for enhancing the fluidity of the dispersion of the pigment and halogenated hydrocarbon in the organic liquid so that it can be effectively milled and applied to the substrate.

If desired, Ink A may contain one or more dyes and/or one or more pigments. When both a dye and a pigment are present, the dye is preferably in solution in the halogenated hydrocarbon and the pigment present as a dispersion.

Ink B

A preferred polymerisable lactone for preparing the coloured condensation polymers which comprise Ink B is caprolactone and a suitable hydroxyalkanoic acid is omega-hydroxydodecanoic acid.

Suitable dyes for the preparation of the coloured condensation polymers are members of any of the known chemical classes of organic dyes, especially the azo (including monoazo and polyazo), anthraquinone, phthalocyanine and benzodifuranone series of dyes but also the nitro, diarylmethane, triarylmethane, xanthene, acridine, quinoline, methine, azine, oxazine, thiazine and indigoid series, providing they contain at least one active hydrogen atom per molecule. In the present context, active hydrogen atoms are defined as hydrogen atoms which are reactive as determined by the Zerewitinoff method, JACS (1927) 49, 3181. The active hydrogen atoms will typically be present in mercapto, carboxy and more especially hydroxy and primary or secondary amino groups present in the dyes. Groups containing such active hydrogen atoms may be directly attached to aromatic or heterocyclic rings present in the dyes or they may be attached to aliphatic residues, for example alkyl groups, which are themselves directly or indirectly attached to the aromatic or heterocyclic rings. Preferred classes of dyes are those classified in the Colour Index as disperse and solvent dyes.

The reaction between the lactone or hydroxyalkanoic acid and the dye may be performed using conditions already described for the polymerisation of lactones in the presence of active hydrogen compounds. Such conditions include the use of temperatures in the range 100° C. to 250° C. The ratio of dye to lactone or hydroxyalkanoic acid is selected so as to give the desired depth of colour in the product. If desired, one or more other active hydrogen containing material, such as a glycol, may be present during the polymerisation.

Specific examples of dyes and pigments suitable for use in Inks A and B are shown in the Examples.

The amount of colorant (dye or pigment) in Ink A or Ink B can be varied within wide limits depending on the strength of the ink required and the depth of shade desired on the substrate. However it is preferred, for reasonable definition, that an ink contains from 1% to 10%, more preferably from 3% to 9%, by weight of a dye or from 5% to 35%, more preferably from 15% to 25%, by weight of a pigment. However in order to optimise light fastness and brightness of shade it may be desirable to use a mixture of a dye and a pigment in proportionately lower amounts to produce a depth of coloration achievable by using an amount of dye or pigment alone lying within the above ranges.

In operating the method of the invention Ink A or Ink B described herein may be used in accordance with procedures already described in relation to hot melt ink-jet printing processes. In particular, the equipment and techniques described in EP-A-0187352 may readily be adapted by persons skilled in the art for use in carrying out the method of the invention.

The invention is illustrated but not limited by the following Examples in which all parts and percentages are by weight.

EXAMPLE 1

1,4-Bis(2-hydroxyisobutylamino)anthraquinone (3.8 g) was stirred with caprolactone (75.6 g) and tetrabutyltitanate (2 drops). After stirring at 170° C. for six hours, the coloured condensation polymer was poured onto a Pyrex dish and allowing to crystallise. The product can be used in hot melt ink jet printing to give a blue shade.

EXAMPLE 2

The dyestuff formed by coupling diazotised 5-amino-4-cyano-3-methylisothiazole with bis(2-hydroxyethyl)-m-toluidine (7 g) was stirred with caprolactone (100 g) and tetrabutyltitanate (2 drops). After stirring at 170° C. for six hours, the coloured condensation polymer was poured onto a Pyrex dish and allowing to crystallise. The product can be used in hot melt ink jet printing to give a magenta shade.

EXAMPLE 3

The procedure of Example 1 was repeated except that the anthraquinone dye was replaced by the dyestuff formed by coupling diazotised 4-aminobenzenesulphonyl-N,N-bis(2-hydroxyethyl)amide with 1-N-ethyl-5-cyano-6-hydroxy-4-methylpyrid-2-one (4 g). The product can be used in hot melt ink jet printing to give a bright yellow shade.

EXAMPLE 4

The procedure of Example 1 was repeated except for the inclusion of 10% by weight of a chlorinated natural rubber ("Alloprene" available from ICI), relative to the coloured condensation polymer. The resulting coloured condensation polymer is suitable for hot melt ink printing.

EXAMPLE 5

The procedure of Example 1 was repeated except for the inclusion of 10% by weight of butylbenzylphthalate relative to the coloured condensation polymer. The resulting coloured condensation polymer is suitable for hot melt ink jet printing.

EXAMPLES 6-16

The procedure described in Example 1 was repeated except that the anthraquinone dye described there was replaced in turn by the dyes identified in the following Table which also gives the colour of the polymeric product which was also suitable for hot melt ink jet printing.

| Example | Dye | Colour |
|---|---|---|
| 6 | Product of coupling diazotised 2-methoxy-5-nitroaniline with N,N-bis-2-hydroxyethyl-m-toluidine | Reddish-yellow |
| 7 | Product of coupling diazotised 3,4-dicyanoaniline with N,N-bis-2-hydroxyethyl-m-aminoacetanilide | Red |
| 8 | Product of coupling diazotised 3,4-dicyanoaniline with N-ethyl-N-hydroxyethyl-m-aminoacetanilide | Bluish-red |
| 9 | 3-phenyl-7-[4-(2-hydroxyethoxy)phenyl]-2,6-dioxo-2,6-dihydrobenzo[1:2-b, 4:5-b']difuran | Red |
| 10 | Product of coupling diazotised 2,4-dinitroaniline with N,N-bis-2-hydroxyethyl-m-aminoacetanilide | Bluish-red |
| 11 | 1-amino-4-hydroxy-2-[4-(2-hydroxyethoxy)phenoxy]anthraquinone | Bluish-red |
| 12 | 1,4-diamino-N-(2-hydroxyethyl)-2,3-anthraquinone dicarboximide | Mid-blue |
| 13 | 1-(1-methyl-3-hydroxypropylamino)-4-amino-5-nitro-8-hydroxyanthraquinone | Turquoise |
| 14 | Product of coupling diazotised 2-amino-3,5-dinitrothiophene with N,N-bis-2-hydroxyethyl-m-aminoacetanilide | Greenish-blue |
| 15 | 1,5-bis-2-hydroxyethylaminoanthraquinone | Blue |
| 16 | Product of coupling diazotised N-(3-hydroxypropanoyl)-p-phenylenediamine with p-cresol | Greenish yellow |

EXAMPLE 17

CI Solvent Blue 36 (29) was dissolved in a solution of a solid chlorinated $C_{18-26}$-paraffin (chlorine content: 70-72%) (14 g) in tetrahydrofuran (98 g). The solution was evaporated to dryness giving a product suitable for hot melt ink jet printing giving high transparency on overhead projection materials.

EXAMPLE 18

The dyestuff formed by coupling diazotised 5-amino-4-cyano-3-methylisothiazole with diethyl-m-toluidine (1 g) was dissolved in a solution of a mixture of chlorinated paraffins (15g) in tetrahydrofuran (99 g). The mixture of paraffins consisted of 90% of the chlorinated paraffin described in Example 17 and 10% of a chlorinated $C_{14-17}$-paraffin (chlorine content: 40%). This solution was evaporated to dryness giving a product suitable for the Production of magenta colours by hot melt ink jet printing which have high transparency.

EXAMPLE 19

The procedure of Example 18 was repeated except for the replacement of the chlorinated $C_{14-17}$-paraffin by the same weight of stearic acid. The product is suitable for use in hot melt ink jet printing.

EXAMPLE 20

CI Solvent Yellow 93 (2 g) was dissolved in a solution of the mixture of chlorinated paraffins described in Example 18 (14 g) in tetrahydrofuran (98 g). This solution was evaporated to dryness giving a product suitable for the bright greenish yellow shades in hot melt ink jet printing.

EXAMPLE 21

The procedure of Example 20 was repeated except for the replacement of the chlorinated $C_{14-17}$-paraffin with chlorinated stearic acid (chlorine content: 35%) to give a product suitable for hot melt ink jet printing.

EXAMPLE 22

The dyestuff formed by coupling diazotised p-chloroaniline with 3-cyano-6-hydroxy-4-methyl-1-octylpyrid-2-one (3 g) was dissolved in a solution of a solid chlorinated $C_{18-26}$-paraffin (chlorine content: 70-72%) (13 g) in tetrahydrofuran (97 g) then evaporated to dryness to give a yellow hot melt ink jet printing ink of high transparency.

EXAMPLES 23-48

The procedure described in Example 19 was repeated except that the dye used was replaced in turn by the dyes identified in the following Table which also states the amount of dye used and the colour of the hot melt ink jet printing ink obtained.

| Ex. | Dye | Quantity | Colour |
|---|---|---|---|
| 23 | Product obtained by coupling diazotised 2-methoxy-5-nitroaniline with N,N-di(methoxycarbonylethyl)-m-aminoacetanilide | 2 g | Golden yellow |
| 24 | Product obtained by coupling diazotised 3,4-dicyanoaniline with N,N-diethyl-m-aminoacetanilide | 2 g | Bluish red |
| 25 | 1-amino-4-hydroxy-2-phenoxy anthraquinone | 4 g | Bluish red |
| 26 | 3-phenyl-7-(4-n-propoxyphenyl)-2,6-dioxo-2,6-dihydrobenzo-[1:2-b, 4:5-b']difuran | 2 g | Red |
| 27 | Product obtained by coupling diazotised 2,4-dinitroaniline with N,N-di(methoxycarbonylethyl)-m-aminoacetanilide | 2 g | Bluish red |
| 28 | 50/50 2-(4-hydroxyphenoxy)- and 2-(4-methoxyphenoxy)-1,5-diamino-4,8-dihydroxyanthraquinone | 3 g | Blue |
| 29 | Product obtained by coupling diazotised 3-acetyl-5-nitro-2-aminothiophene with N,N-diethyl-m-aminoacetanilide | 2 g | Blue |
| 30 | Product obtained by coupling diazotised p-aminoacetanilide with p-cresol | 3 g | Greenish yellow |
| 31 | Product obtained by coupling diazotised 2-amino-6-thiocyanato-1,3-benzthiazole with N,N-di(2-acetoxyethyl)-m-toluidine | 2 g | Bluish red |
| 32 | Product obtained by coupling diazotised 2,5-dichloro-4-nitroaniline with N,N-diethyl-m-aminoacetanilide | 2 g | Bluish red |
| 33 | Product obtained by coupling diazotised 2-cyano-4-nitroaniline with N,N-di(2-acetoxyethyl)-m-toluidine | 3 g | Bluish red |
| 34 | 50/50 mixture of the methyl and ethyl esters of 1-amino-2-(4-carboxymethoxyphenoxy)-4-hydroxyanthraquinone | 4 g | Bluish red |
| 35 | Product obtained by coupling diazotised 2-cyano-4-nitroaniline with N,N-di(2-acetoxyethyl)aniline | 3 g | Red |
| 36 | 4-hydroxy-4'-nitrodiphenylamine | 4 g | Yellow |
| 37 | Product obtained by coupling diazotised 4-chloroaniline with 1-n-butyl-5-cyano-4-methyl-6-hydroxypyrid-2-one | 2 g | Yellow |

-continued

| Ex. | Dye | Quantity | Colour |
|---|---|---|---|
| 38 | Product obtained by coupling diazotised 2-nitroaniline with 1-ethyl-4-methyl-6-hydroxypyrid-2-one | 2 g | Yellow |
| 39 | Product obtained by coupling diazotised 2-nitroaniline with 1-(2-ethylhexyl)-5-cyano-4-methyl-6-hydroxypyrid-2-one | 3 g | Yellow |
| 40 | Product obtained by coupling diazotised 4-methoxyethoxyethoxy carbonylaniline with 1-ethyl-5-cyano-4-methyl-6-hydroxypyrid-2-one | 3 g | Yellow |
| 41 | Product obtained by coupling diazotised 4-(N-2-ethylhexyl-sulphamoyl)aniline with 1-n-butyl-5-cyano-4-methyl-6-hydroxypyrid-2-one | 3 g | Yellow |
| 42 | 1,5-diamino-4,8-dihydroxy-anthraquinone | 3 g | Blue |
| 43 | Product obtained by coupling diazotised 2-bromo-4,6-dinitro-aniline with N-ethyl-N-methoxy-ethoxycarbonylethyl-3-acetylamino-6-methoxyaniline | 2 g | Blue |
| 44 | 1,5-bis-methoxyethoxycarbonyl-ethylamino-4-hydroxyanthraquinone | 3 g | Blue |
| 45 | Mixture of 1,4-bis-methylamino and 1,4-bis-hydroxyethylamino-5,8-dihydroxyanthraquinone | 4 g | Blue |
| 46 | 1-(o-toluidino)-3-bromo-anthraquinone | 4 g | Blue |
| 47 | 1-sec.butylamino-4-amino-5-nitro-8-hydroxyanthraquinone | 3 g | Turquoise blue |
| 48 | Product obtained by coupling diazotised 3,5-dinitro-2-amino-thiophene with N,N-diethyl-m-aminoacetanilide | 2 g | Bluish green |

The stearic acid used in Examples 19 and 23–48 can be replaced by palmitic acid or carnauba wax. Any of these materials can suitably be used at a level of from 5 to 10% of the halogenated paraffins.

EXAMPLE 49

A mixture of toluene (48 g), Pigment Blue 15:3 (40 g), Dispersant 8 described in EP 208041A (8 g) and Fluidising Agent 1 described in EP 208041A (4 g) was milled with 3 mm glass beads on a flat bed shaker for 24 hours. The dispersion was diluted with a 10% solution of a $C_{18-26}$ chlorinated aliphatic hydrocarbon (chlorine content: 70%) in toluene and also containing 10 g of a blue dye (1036 g) to give a finely divided fluid dispersion with a pigment/dye content of 4.4%. Evaporation to remove all of the solvent gave a hot melt ink jet printing ink capable of giving cyan shades.

EXAMPLE 50

A mixture of toluene (51 g), Pigment Red 48:2 (35 g) and Dispersant 8 described in EP 208041A (14 g) was milled with 3mm glass beads on a flat bed shaker for 24 hours. The dispersion was diluted with a 10% solution of a $C_{18-26}$ chlorinated aliphatic hydrocarbon (chlorine content: 70%) in toluene and also containing 8.759 of a magenta dye (894.3 g) to give a finely divided fluid dispersion with a pigment/dye content of 4.4%. Removal of the solvent gave a magenta hot melt ink jet ink.

The magenta dye used in this Example was the product obtained by coupling diazotised 5-amino-4-cyano-3-methylisothiazole with N,N-diethyl-m-toluidine.

EXAMPLE 51

A mixture of methyl isobutyl ketone (52 g), Pigment Yellow 12 (30 g), Dispersant 8 described in EP 208041A (12 g) and SOLSPERSE 22000 (6 g) was milled with 3 mm glass beads on a flat bed shaker for 24 hours. The dispersion was diluted with a 10% solution of a $C_{18-26}$ chlorinated aliphatic hydrocarbon (chlorine content: 70%) in methyl isobutyl ketone and also containing 7.5 g of a yellow dye (752.2 g) to give a finely divided fluid dispersion with a pigment/dye content of 4.4%. Removal of the solvent gave a yellow product suitable for hot melt ink jet printing.

The yellow dye used in this Example was the product obtained by coupling diazotised 4-chloroaniline with 1-n-butyl-5-cyano-4-methyl-6-hydroxypyrid-2-one.

EXAMPLE 52

A mixture of tetrahydrofuran (54.5 g), Pigment Blue 15.3 (35 g), Dispersant 8 described in EP 208,041A (7 g) and Fluidising Agent 1 described in EP 208,041A (3.5 g), was milled with 3 mm glass beads on a flat bed shaker for 24 hours. The dispersion was diluted with a 10% solution of a $C_{18-26}$-chlorinated aliphatic hydrocarbon (chlorine content: 70%) in tetrahydrofuran (700 g) to give a finely-divided, fluid dispersion with a pigment content of 4.4%.

The dispersion on removal of the solvent gave a clear blue transparent material suitable for hot melt ink jet printing on overhead projection slides.

Further Examples are given below of formulations suitable for coating on to 6 micron polyester film.

EXAMPLE 53

A mixture of toluene (48 g), Pigment Blue 15:3 (40 g), Dispersant 8 described in EP 2C8041A (8 g), and Fluidising Agent 1 described in EP 208041A (4 g) was milled with 3 mm glass beads on a flat bed shaker for 24 hours. The dispersion was diluted with a 10% solution of a $C_{18-26}$-chlorinated aliphatic hydrocarbon (chlorine content: 70%) in toluene (809 g) to give a finely divided fluid dispersion with a pigment content of 4.4%.

Evaporation to remove the solvent gave a product suitable for hot melt ink jet printing.

EXAMPLES 54–56

The toluene of Example 53 was replaced by the following solvents:
Example 54: Methyl ethyl ketone
Example 55: Methyl isobutyl ketone
Example 56: Xylene.

EXAMPLE 57

A mixture of toluene (51 g), Pigment Red 48:2 (35 g) and Dispersant 8 described in EP 208041A (14 g), was milled with 3 mm glass beads on a flat bed shaker for 24 hours. The dispersion was diluted with a 10% solution of a $C_{18-26}$-chlorinated aliphatic hydrocarbon (chlorine content: 70%) in toluene (700 g) to give a finely divided fluid dispersion with a pigment content of 4.4%.

EXAMPLE 58

The toluene of Example 57 was replaced by Xylene.

EXAMPLE 59

The Pigment Red 48:2 of Example 57 was replaced by Pigment Red 57:1.

EXAMPLES 60-63

The toluene of Example 59 was replaced by the following solvents:
Example 60 Tetrahydrofuran
Example 61 Methyl ethyl ketone
Example 62 Methyl isobutyl ketone
Example 63 Xylene

EXAMPLE 64

A mixture of methyl isobutyl ketone (52 g), Pigment Yellow 12 (30 g), Dispersant 8 described in EP 208041a (12 g) and SOLSPERSE 22000 (6 g) was milled with 3 mm glass beads on a flat bed shaker for 24 hours. The dispersion was diluted with a 10% solution of a $C_{18-26}$-chlorinated aliphatic hydrocarbon (chlorine content: 70%) in methyl isobutyl ketone (581.8 g) to give a finely divided fluid dispersion with a pigment content of 4.4% which on removal of solvent was suitable for hot melt ink jet printing giving shades of good transparency.

EXAMPLE 65

The Pigment Yellow 12 of Example 64 was replaced by Pigment Yellow 13.

We claim:

1. A method of printing in which a solid ink composition is melted and ejected from a small orifice in the form of small drops directed towards a substrate on which an image is to be formed, characterised in that the solid ink composition comprises either a solution or a dispersion of a dye or a finely divided pigment in a halogenated hydrocarbon having a melting point of at least 50° C. ("Ink A"), or a coloured condensation polymer obtained by reacting a polymerisable lactone or a hydroxyalkanoic acid with a dye containing at least one active hydrogen atom ("Ink B").

2. A method of printing according to claim 1 wherein the halogenated hydrocarbon is a chlorinated paraffin or mixture of chlorinated paraffins having a chlorine content of from 65% to 72% by weight.

3. A method of printing according to claim 1 wherein said halogenated hydrocarbon comprises at least 90% of Ink A.

4. A method of printing according to claim 1 in which said Ink A also contains one or more additives selected from waxes, softening agents and stabilisers.

5. A method of printing according to claim 1 wherein in Ink B said polymerisable lactone is caprolactone.

6. A method of printing according to claim 1 wherein in Ink B said hydroxyalkanoic acid is omega-hydroxydodecanoic acid.

7. A method of printing according to any one of claims 1 to 6 in which said dye is a disperse dye or solvent dye.

8. A substrate which has been printed by the method of printing of claim 1.

* * * * *